(12) United States Patent
Dreier-Poepperl (10) Patent No.: US 8,565,400 B2
(45) Date of Patent: *Oct. 22, 2013

(54) CALL MANAGEMENT SYSTEM FOR A MOBILE TELEPHONE

(71) Applicant: Adaffix GmbH, Vienna (AT)

(72) Inventor: Claudia Dreier-Poepperl, London (GB)

(73) Assignee: Adaffix GmbH, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,380

(22) Filed: Mar. 4, 2013

(65) Prior Publication Data

US 2013/0178197 A1 Jul. 11, 2013

Related U.S. Application Data

(63) Continuation of application No. 12/663,455, filed as application No. PCT/GB2008/050421 on Jun. 6, 2008, now Pat. No. 8,416,934.

(30) Foreign Application Priority Data

Jun. 8, 2007 (GB) .................................. 0711113.1

(51) Int. Cl.
*H04M 3/42* (2006.01)
*H04M 3/54* (2006.01)

(52) U.S. Cl.
USPC .............. 379/201.01; 379/211.01; 455/414.1; 455/414.2; 455/417

(58) Field of Classification Search
USPC ............ 379/201.01, 201.02, 201.04, 207.02, 379/211.01, 211.02, 212.01, 355.02; 455/414.1, 414.2, 414.3, 417, 550.1, 455/564, 565, 566
See application file for complete search history.

(56) References Cited

U.S. PATENT DOCUMENTS

| | | | |
|---|---|---|---|
| 5,754,630 | A | 5/1998 | Srinivasan |
| 6,389,278 | B1 | 5/2002 | Singh |
| 2002/0086710 | A1 | 7/2002 | Humes |
| 2002/0186828 | A1 | 12/2002 | Bushnell |

FOREIGN PATENT DOCUMENTS

| | | |
|---|---|---|
| EP | 1 267 557 | 12/2002 |
| WO | WO 98/09463 | 3/1998 |
| WO | WO 00/70888 | 11/2000 |

*Primary Examiner* — Harry Hong
(74) *Attorney, Agent, or Firm* — Lempia Summerfield Katz LLC (57) ABSTRACT

A call management system having a call monitor operable to identify an attempt, in use, by a user to call a predetermined number attributed to a first entity; a processor, configured to derive at least one alternative number, attributed to another entity, based on the predetermined number attributed to the first entity; and a router to provide a user with an opportunity to route a or the call to at least one of the derived at least one alternative numbers.

20 Claims, 8 Drawing Sheets

CALL MANAGEMENT SYSTEM FOR A MOBILE TELEPHONE

RELATED APPLICATIONS

This application is a Continuation Patent Application under 37 C.F.R. §1.53(b) of U.S. patent application Ser. No. 12/663,455, which was filed on Dec. 7, 2009, which is incorporated herein by reference in its entirety for all purposes. U.S. patent application Ser. No. 12/663,455 was a national stage entry of Patent Cooperation Treaty Application No. GB2008/050421, which was filed on Jun. 6, 2008, which is incorporated herein by reference in its entirety for all purposes.

BACKGROUND

The present invention relates to a call management system for a telephone, a database, a telephone and to methods and systems for managing a call.

When a user attempts to make a telephone call, the connection is not always successful. For example, the other party may be engaged on another call; their telephone may be switched off, out of range, or otherwise unavailable; the other party may decline to accept the call; or the other party may not be available to take the call. In domestic situations, when there is a firm intention on the part of the user to contact only the intended other party, such situations are inconvenient but a further attempt at connection is generally made, and successful, after a brief period of time.

When a user is attempting to contact the provider of a service (e.g. a business) the failure to make a connection is especially inconvenient, since the user may wish to obtain the services as soon as possible. As with the above described domestic situation, the service provider may be engaged on another call and unable to take the incoming call, or may be away from the telephone and not be able to answer the call. Even if the service provider has multiple telephone lines, all of the lines may be busy. There are myriad other reasons why the connection may not be possible.

Suppose that a user's vehicle has broken down and the user attempts to contact a breakdown recovery service. Failure to connect to the recovery service on the first attempt results in the user having to wait by the roadside, making repeated attempts to connect to the recovery service. It is rare that a user who has broken down by the roadside will have ready access to a list of other recovery services in the area. To find alternative services may require the user to leave their vehicle to locate a telephone directory, or make use of a chargeable directory service.

Ultimately, the failure to connect calls results in reduced revenue for the telephone network operator. This is because the network operator does not collect payment from a user for an unconnected call but still incurs overhead costs for the operation of the telephone network infrastructure handling the attempted connection.

It is estimated that, on average, for the telephone network as a whole (including fixed line, mobile networks, VoIP etc), over 20% of all voice calls are not connected on the first attempt. With mobile networks, particularly, available signal strengths influence call connections still further and it is estimated that between 30% and 40% of calls including a mobile telephone are not connected on the first attempt. This figure may be still higher for mobile-to-mobile calls.

BRIEF SUMMARY

There is a need, therefore, at least to reduce the number of failed connections and to increase the ability of a user to reach a party on the first attempt to establish a connection.

Accordingly, one embodiment of the present invention provides a call management system for a telephone, comprising: a call monitor to identify an attempt, in use, by a user to call a predetermined number attributed to a first entity; a processor, to derive at least one alternative number attributed to another entity, based on the predetermined number attributed to the first entity, when a predetermined condition has been met; and a router to provide a user with an opportunity to route a or the call to at least one of the derived at least one alternative numbers.

In one embodiment, the processor is configured to derive at least one alternative number by communicating with a telephone network in which the telephone is operable.

In one embodiment, the processor is configured to derive at least one alternative number by communicating with an internet based telephone directory.

In one embodiment, the processor is configured to automatically connect to the internet and derive the at least one alternative number therefrom.

In one embodiment, the router is configured to route the call to at least one of the derived at least one alternative numbers.

In one embodiment, the router is configured to route the call in response to a user generated input.

In one embodiment, the system is configured to provide the user with a list of at least one of the derived at least one alternative numbers.

In one embodiment, the router is configured to route a or the call to a user selected one of the derived at least one alternative numbers.

In one embodiment, the router is configured to terminate the attempt to call the predetermined number.

In one embodiment, the call monitor is configured to identify when a connection has been established between a user and a predetermined number attributed to a first entity, and the processor is configured to derive at least one alternative number, attributed to another entity, based on the predetermined number attributed to the first entity after a connection has been made.

In one embodiment, the call monitor is configured to retrieve information attributed to the predetermined number.

In one embodiment, the processor is operable to analyse the predetermined number.

In one embodiment, the processor is configured to identify the first entity from the predetermined number.

In one embodiment, the processor is configured to derive attributes of the first entity.

In one embodiment, the processor is configured to identify at least one other entity having attributes similar or identical to the derived attributes of the first entity.

In one embodiment, the processor is operable to order the derived at least one alternative number.

In one embodiment, the call management system further comprises a bidding system, operable to receive bids from entities to ensure that a number associated with each bidding entity is one of the derived at least one alternative numbers.

In one embodiment, the processor is configured such that the order of the derived at least one alternative number is based on the bid value of each bidding entity.

In one embodiment, the router is configured to route a call to a human-operated directory service if the processor is unsuccessful in deriving at least one alternative number.

In one embodiment, the call management system further comprises a database, containing information relating to at least one entity, and at least one telephone number attributed to the at least one entity.

In one embodiment, the call management system comprises an interface to connect the processor to the database.

In one embodiment, at least a part of the database is remote from the processor.

In one embodiment, the call management system further comprises an information provider, operable to transmit a voice message to the user whilst the attempt to call the predetermined number is being made.

In one embodiment, the first entity provides a service, and the said other entity provides a dissimilar service to that of the first entity.

One embodiment of the present invention provides a database for a call management system according to the invention, the database containing information relating to at least one entity, and at least one telephone number attributed to the at least one entity.

One embodiment of the present invention provides a database for a call management system, the call management system for a telephone and comprising a call monitor operable to identify an attempt, in use, by a user to call a predetermined number attributed to a first entity, a processor, configured to derive at least one alternative number attributed to another entity, based on the predetermined number attributed to the first entity, when a predetermined condition has been met; and a router to provide a user with an opportunity to route a or the call to at least one of the derived at least one alternative numbers, the database containing information relating to at least one entity, and at least one telephone number attributed to the at least one entity.

One embodiment of the present invention provides a call management system for a telephone, comprising: a call monitor configured to identify an attempt, in use, by a user to call a predetermined number attributed to a first entity; a processor, configured to derive at least one alternative number attributed to another entity, based on the predetermined number attributed to the first entity, when a predetermined condition has been met; and a router configured to route a or the call to at least one of the derived at least one alternative numbers in response to the user depressing at least one button on the keypad of a telephone being used to attempt to make the call.

One embodiment of the present invention provides a method of managing a call from a telephone, the method comprising: identifying an attempt by a user to call a predetermined number attributed to a first entity; deriving at least one alternative number attributed to another entity, based on the predetermined number attributed to the first entity, when a predetermined condition has been met; and providing the user with an opportunity to route a or the call to at least one of the derived at least one alternative numbers.

One embodiment of the present invention provides a method of managing a call from a telephone, the telephone comprising a call monitor, a processor and a router, the method comprising: using the call monitor to identify an attempt by a user to call a predetermined number attributed to a first entity; using the processor to derive at least one alternative number attributed to another entity, based on the predetermined number attributed to the first entity, when a predetermined condition has been met; and using the router to provide the user with an opportunity to route a or the call to at least one of the derived at least one alternative numbers.

In one embodiment, the method comprises routing the call to at least one of the derived at least one alternative numbers, in response to a user generated input.

In one embodiment, the method comprises providing the user with a list of at least one of the derived at least one alternative numbers.

In one embodiment, the derivation of at least one alternative number is performed whilst the attempt to call the predetermined number is in progress.

In one embodiment, the derivation of at least one alternative number is performed after a connection to the predetermined number has been made.

In one embodiment, the method comprises retrieving information attributed to the predetermined number.

In one embodiment, the method comprises analysing the predetermined number.

In one embodiment, the method comprises identifying the first entity from the predetermined number.

In one embodiment, the method comprises deriving attributes of the first entity.

In one embodiment, the method comprises analysing attributes of the first entity and comparing them with those of other entities to identify at least one other entity having attributes similar or identical to the derived attributes of the first entity.

In one embodiment, the method comprises ordering the derived at least one alternative number.

In one embodiment, the method comprises operating a bidding system to receive bids from entities to ensure that a number associated with each bidding entity is one of the derived at least one alternative numbers.

In one embodiment, the order of the derived at least one alternative number is based at least partially on the bid value of each bidding entity.

In one embodiment, the method comprises routing the call to a human-operated directory service if attempting to derive at least one alternative number is unsuccessful.

In one embodiment, the method comprises providing a database containing information relating to at least one entity, and at least one telephone number attributed to the at least one entity.

In one embodiment, the method comprises transmitting a voice message to the user whilst the attempt to call the predetermined number is being made.

One embodiment of the present invention provides a method of managing a call from a telephone, the telephone comprising a call monitor, a processor and a router, the method comprising: identifying an attempt by a user to call a predetermined number attributed to a first entity; deriving at least one alternative number attributed to another entity, based on the predetermined number attributed to the first entity, when a predetermined condition has been met; and routing a or the call to at least one of the derived at least one alternative numbers in response to the user depressing at least one button on the keypad of a telephone being used to attempt to make the call.

In one embodiment, the telephone is a mobile telephone.

One embodiment of the present invention provides a computer readable medium storing computer executable code operable to carry out the method of the present invention.

One embodiment of the present invention provides a call management system for a mobile telephone, comprising: a call monitor operable to identify an attempt, in use, by a user to call a predetermined number attributed to a first entity; a processor connectable to the network in which the mobile telephone operates, configured to derive at least one alternative number attributed to another entity, based on the predetermined number attributed to the first entity, when a predetermined condition has been met; and a router to provide a user with an opportunity to route a or the call to at least one of the derived at least one alternative numbers.

One embodiment of the present invention provides a mobile telephone comprising: a call monitor operable to identify an attempt, in use, by a user to call a predetermined number attributed to a first entity; a processor, configured to derive at least one alternative number attributed to another entity, based on the predetermined number attributed to the first entity, when a predetermined condition has been met; and a router to provide a user with an opportunity to route a or the call to at least one of the derived at least one alternative numbers.

In one embodiment, the predetermined condition is at least one of: there being no answer from the predetermined number after a predetermined period of time; the predetermined number being busy; and the call being ended within a predetermined period of time after a connection to the predetermined number has been made.

BRIEF DESCRIPTION OF THE DRAWINGS

The present invention will now be described, by way of example, with reference to the accompanying figures in which.

DETAILED DESCRIPTION

Figure 1:
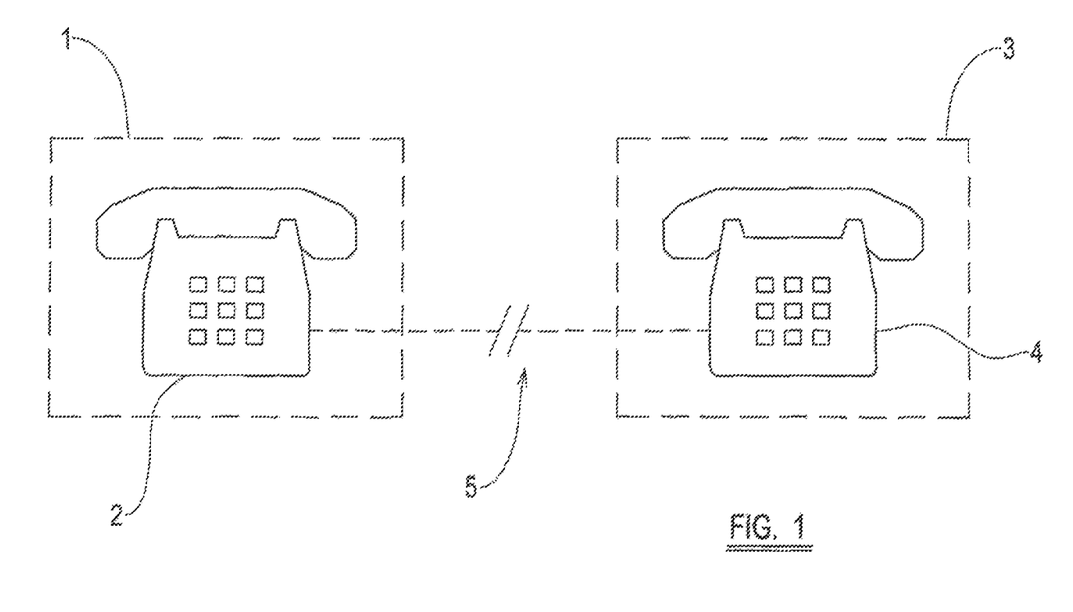
FIG. 1 shows a representation of a known connection between a user 1 and a first entity 3.

FIG. 1 shows a schematic representation of a telephone, having a telephone number that is associated with an entity. The first telephone in FIG. 1 depicts a user 1, having a telephone number 2 and a second telephone depicts a first entity 3 having a telephone number 4. In reality, there is an extensive telephone network 5 between the user 1 and the first entity 3, and maybe a considerable geographical distance; but these have been omitted to represent the system in its simplest form. It should be noted that the use of an illustration of a domestic telephone for the telephone number 2 is schematic only. One embodiment of the present invention is implemented in a mobile telephone, so the reader should interpret the illustration of the domestic telephone to include a mobile telephone (cell telephone) as well as a domestic telephone.

When a user 1 wishes to contact a first entity 3, the user 1 will attempt to call the first entity 3 using a predetermined number 4 attributed to that first entity 3. The attempt to call the predetermined number 4 includes entering the predetermined number 4 on a keypad of a telephone of the user 1. Alternatively, a call management system embodying the present invention may provide voice recognition, enabling the user to orally enter the telephone number. The predetermined number may be stored in memory on the telephone. In any event, a request from the user's telephone will be sent to the telephone network 5 to make a connection with the predetermined number 4 attributed to the first entity 3. As is known in the art, the number from which the call originates is called the "A" number and the dialled number is termed the "B" number.

Following the request being made, the network operator will attempt to establish a connection between the A and B numbers. During this attempt, the user 1 will generally hear a dialling tone. At the same time, the telephone associated with the B number will be indicating that a party is attempting to contact the B number. This indication may be performed by a ringing tone. In response, the first entity 3 may decide to answer the call, following which a connection will be made between the A and B numbers and the user 1 and the first entity 3 can engage in conversation.

Alternatively, the first entity 3 may not be available to accept the call. In which case, the telephone of the first entity 3 continues to ring until the user 1 terminates the attempt to establish a connection or, alternatively, the first entity 3 may return a "busy" signal to the network provider.

Alternatively the user may be greeted with an answering machine of the first entity 3. The user can leave a message, but is not really satisfied as he cannot talk to a person.

The first entity 3 may already be engaged on another call. No connection at that time between the A number and B number will therefore be possible. In this situation, the user 1 will be met with a "busy" or "engaged" tone, almost at the instant a connection is attempted to be made between the A and B numbers. The user 1 may wish to attempt to establish a connection with the B number at a later point in time.

Alternatively, it may not be possible to connect the A number to the B number due to a lack of network coverage or service in the vicinity of the first entity attributed to the B number.

It is inconvenient if the user 1 cannot establish a connection with the first entity 3. In the case where the user 1 requires a service from the first entity 3, as described above, the failure to establish a connection between the A and B numbers will mean that the user 1 will not be able to be provided with the service by the first entity 3.

A system and method embodying the present invention seeks to at least reduce the number of failed connections and to increase the ability of a user 1 to reach an entity.

Figure 2:
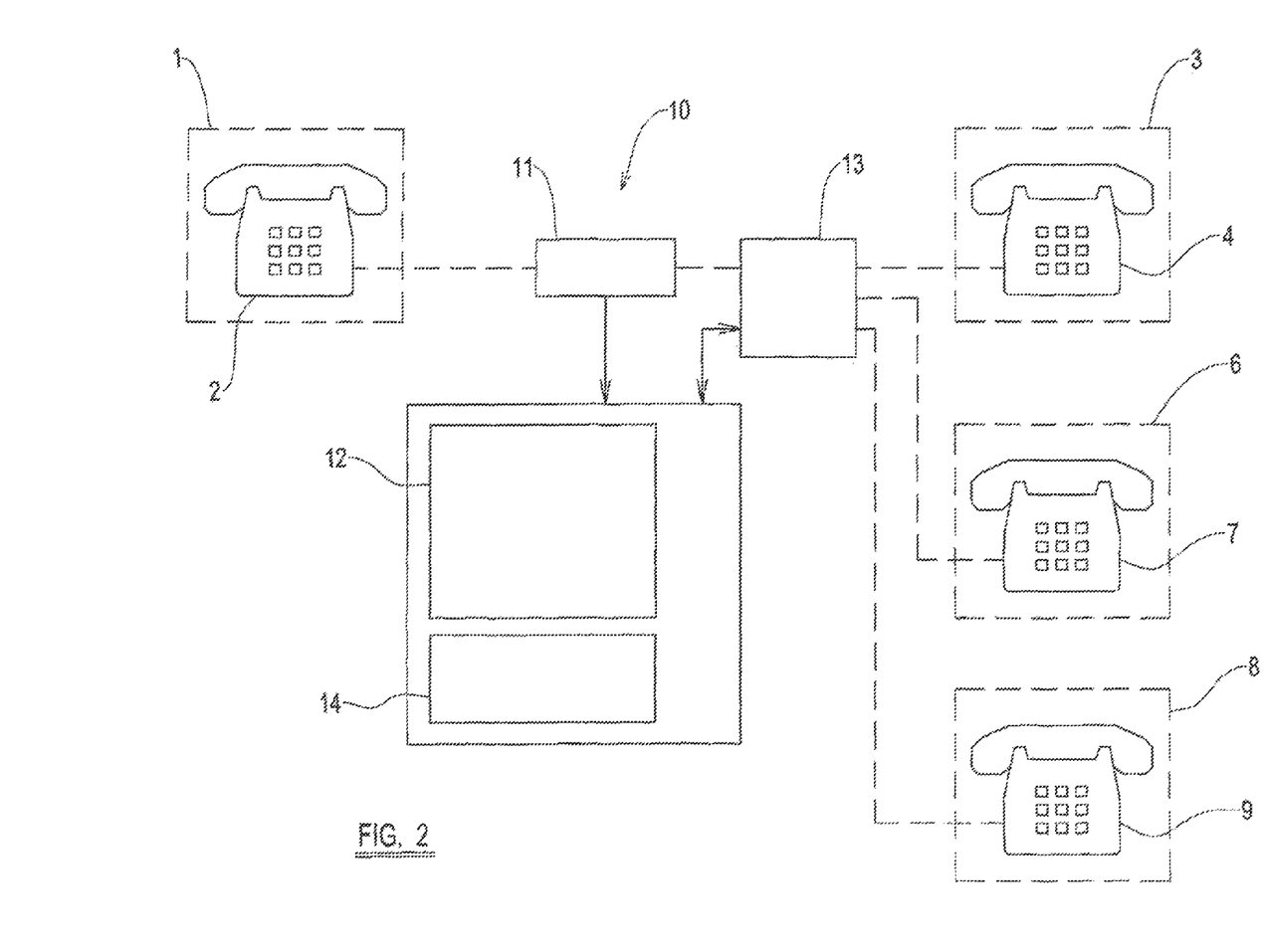
FIG. 2 shows a schematic representation of a call management system embodying the present invention.

FIG. 2 shows a schematic representation of a call management system 10 embodying the present invention. The depictions of the user 1 and first entity 3 are the same as shown in FIG. 1, with the same reference numerals having been used. In addition, there are shown further entities 6, 8 having respective associated telephone numbers 7, 9 attributed to them.

The call management system of FIG. 2 comprises a call monitor 11, a processor 12 and a router 13.

The call monitor 11 is located in the call management system 10 such that it can monitor any attempts by the user 1 to establish a connection with a predetermined number 4, such as that of the first entity 3. Preferably, the call monitor 11 is non-intrusive to the call.

The call monitor 11 is connected to the processor 12, providing the processor 12 with information when the call monitor 11 identifies that a user 1 has attempted to call a predetermined number 4 associated with a first entity 3. The processor 12 may then subsequently perform operations on the information provided by the call monitor 11.

The call monitor 11 may provide the processor 12 with the B number being called (i.e. the predetermined number 4 of the first entity). Additionally, or alternatively, the call monitor 11 may determine the locality of the B number, by recognising a portion of the B number as being associated with a particular area (based on pre-stored attributes such as STD codes).

Various other attributes associated with the B number may be identified by the call monitor 11.

The processor 12 is operable to analyse the predetermined number 4. In one embodiment, the processor 12 identifies the first entity 3 from the predetermined number 4. This is achieved by matching the predetermined number 4 to entries in a database 14 of telephone numbers. If the first entity 3 is present in the database, with its associated telephone number, a system 10 embodying the present invention will match the predetermined number 4 identified by the call monitor 11 with the number in the database; and derive therefrom the name of the first entity 3.

Additionally, for each entry in a database 14 embodying the present invention, there may be stored attributes associated with each entity 3, 6, 8. For example, the street address of the entity 3, 6, 8, the type of business, the services offered by the entity, the products sold by the entity 3, 6, 8, the website of the entity, other contact information of the entity 3, 6, 8, etc.

Accordingly, when a corresponding entity 3, 6, 8 is identified in the database, which corresponds to the predetermined number 4 identified by the call monitor 11, all the attributes associated with the entity 6, 8 may be returned by the processor 12 for subsequent operations. Using the returned attributes, the processor 12 is configured to identify at least one other entity 6, 8, having an entry in the database, which has attributes at least similar or relevant to the attributes of those of the first entity 3. It can be said, therefore, that the returned entities 6, 8 are 'related' to the first entity 3. For example, the returned entities 6, 8 may offer similar services to the first entity 3. The first entity 3 may offer automobile hire, for example, whilst the returned entities 6, 8 may offer van hire. Alternatively, the returned entities 6, 8 may offer general vehicle hire, including automobile hire. Nevertheless, it can be said that the returned entities, or at least the services they offer, are related to the first entity 3. Moreover, a user 1 may be interested in the services provided by the other entities as matching closely those of the first entity 3.

The returned entities 6, 8 may be ordered according to deemed relevance. For example, if a large number of entities are returned, being based over a large geographical area, they may be ranked according to their distance from the location of the first entity or, alternatively, the user.

Although the provision of a previously-populated database 14 has been described, a system 10 according to the present invention may perform a reverse look-up operation on a predetermined number 4, Thus, the predetermined number 4 may be inputted into a directory service and the directory service may return not only the name of the first entity 3 associated with the predetermined number 4 but also other related numbers attributed to other entities 6, 8. Any reverse look-up operation is preferably only conducted in directories comprising business numbers, so as to avoid residential numbers receiving routed calls. Alternatively or additionally, there may be a validation procedure to validate that a returned number is a business number. Call management systems embodying the present invention may be operable to derive from a B-number whether the number is a business or residential number. Preferably, a database containing a "white list" of approved business numbers is used. An advantage of such an arrangement is that the privacy of residential numbers is maintained.

Although the embodiment described above only seeks to identify an attempt to call a B number associated with a business, the present invention may also be operable to identify an attempt to call a B number associated with a residential entity, or any type of entity. For example, the first entity may be a friend or relative of the user. A call management system embodying the present invention may identify attributes associated to the B number; derive an alternative number based on those attributes and provide the user with an opportunity to route a call to the alternative number. For example, if a user was to call the B number of a residential first entity, e.g. a friend, and the call is not successful, the user may be provided with an opportunity to route a or the call to an alternative number. The alternative number may, for example, be for another entity in the vicinity of either the user or the residential first entity.

Preferably, the present invention provides a bidding system, whereby entities may bid to ensure that their number is available to be provided to a user as an alternative. Should the call management system deem that entity's services to be relevant to the user, their telephone number (or contact details) may then be provided to the user, as long as they are deemed relevant.

With each identified other entity 6, 8 there is associated a telephone number 7, 9. Preferably, upon deriving at least one other entity 6, 8 which is related in some way to the first entity 3, the telephone number 7, 9 of the at least one other entity 6, 8 may also be returned by the processor 12.

The call management system 10 comprises a router 13. The router 13 provides the user 1 with an opportunity to route the call to at least one of the derived at least one alternative numbers 7, 9, as described in more detail below.

In some embodiments, the router 13 provides a user 1 with an opportunity to route the call to an alternative number 7, 9 before the connection to the predetermined number 4 has been established, i.e., whilst it is still ringing. Other embodiments provide the user 1 with an opportunity to route a call to an alternative number 7, 9 after the connection to the predetermined number 4 has been established, i.e. when it has been answered and during the call; or even after the user 1 has completed a call with the predetermined number 4. The latter embodiment will be described later. The call may be deemed "completed" when the call is terminated. The user may have ended the call after retrieving the desired outcome, or may have hung up.

Firstly, embodiments where the router 13 provides a user 1 with an opportunity to route a call to an alternative number 7, 9 before the connection to the predetermined number 4 has been established, will be described.

In one embodiment, as the user 1 is listening to a dialling tone, attempting to establish a connection with the first entity 3, a voice message may be played to the user 1 over the dialling tone. Preferably, the dialling tone is not affected by the message. Should the connection to the first entity 3 be established whilst the message is playing, the establishment of the connection may terminate the message.

The message may convey to the user 1 at least one alternative number 7, 9 that is available to attempt to connect to. Preferably, the alternative number 7, 9 is one derived by a processor 12 of a call management system 10 embodying the present invention. The message may not provide the user 1 with many details of the other entity 6, 8 associated with the alternative number 7, 9 but may simply notify the user 1 that an alternative number 7, 9 is available to connect to. For example, the message may read "We are trying to connect you. To be connected to an alternative number, please press the # key". Should the user 1 then press the # key, the call will be routed to the alternative number 7, 9. Preferably, the attempt to establish a connection with the first user 1 may be aborted upon pressing the # key. Although the example of the "#" key is described above, it will readily be appreciated that any key, or combination of keys, may be used as a trigger.

Alternatively, or additionally, a call management system embodying the present invention may receive voice commands from the user.

In another modified embodiment to that described above, the message played to the user 1 may inform the user 1 of the name of the other entity 6, 8 to which the user 1 is being routed.

In another embodiment, the message played to the user 1 whilst waiting to establish a connection the first entity 3 may take the form: "We are trying to connect you. Here are your alternatives: For A press #1, for B press #2, for C press #3". Such a system allows for the user 1 to make a choice between the returned alternative numbers 7, 9. As described above, the system may recognise key commands other than the "#" key. Alternatively, voice commands may be used. The operation of a key, or combination of keys, may be dependent on the message being played. For example, a message may contain a list of separated options. The system may be configured such that whichever option is being presented to the user when the user presses a given key will be selected. Additionally, since the option of routing the call to a larger selection of entities 6, 8 is provided, higher income may be generated from those entities 6, 8 by the operator of the call management system 10.

In a still further embodiment, the message played to the user 1 may be longer and contain additional information to that described above. For example, the initial greeting may be: "We are trying to connect you. For relevant alternative numbers, please press the # key". Thereafter, the user 1 may be directed to a hierarchical menu system, offering the user 1 various options. The message may include the names of alternative numbers 7, 9 to connect to. For each number, there may be associated information relating to the corresponding entity 6, 8, for example discounts or promotions currently being offered by the entities 6, 8.

In other embodiments of the present invention, it may occur that the alternative numbers 7, 9 derived by the processor 12 are not relevant enough to be provided to the user 1. In another embodiment, the alternative number 7, 9 or numbers may be presented to the user 1 but the user 1 deems that none of the alternative numbers 7, 9 will suffice. Accordingly, in one embodiment of the present invention, there is a provided the option of the user 1 being transferred to a telephone directory service. The telephone directory service may be human-operated. The option of being directed to a directory service may always be included as an available option when presented with alternative numbers 7, 9 of other entities 6, 8. Alternatively, the option to route the call to a directory service may only be offered when no relevant alternative numbers 7, 9 have been identified.

Preferably, the processor 12 of a call management system 10 embodying the present invention is operable to determine at least one alternative number for a directory service, to which the call may be routed to. Thus, should there be a large number of available directory services, the processor 12 of the call management system may determine which is the most relevant. For example, some directory services may be specialised in offering restaurant listings, while others may be specialised in other business areas. Advantageously, the available directory services are ranked. The ranking may be in accordance with the amount that each directory service has bid to be listed as an alternative number. It will be appreciated that a directory service can be viewed simply as another 'entity', and is thus analogous to the entities described above.

When providing the user 1 with an opportunity to have the call routed to an alternative number 7, 9, although the user 1 may be amenable to being routed, they may not wish to be routed to the alternative number 7, 9 immediately. In one embodiment of the present invention, the message played to the user 1 when attempting to connect to the first entity 3 may be: "We are trying to connect you. To receive alternative relevant numbers via SMS, please press the # key". If the user 1 then presses the # key, and assuming the user 1 is calling using a mobile telephone, an SMS (short messaging service) 'text message' will then be sent to the user 1, with a list of at least one alternative number 7, 9, to call. In other embodiments, a WAP push message or MMS message may be sent to the user. The user 1 may then call, or not, the alternative numbers 7, 9 at his pleasure. Preferably, the call monitor 11 of the call management system 10 embodying the present invention is operable to identify the A number (the user 1's number) automatically, to enable the text message to be sent without need for the user 1 to enter a destination number. There may additionally, or alternatively, be the option to enter an alternative mobile telephone number. Advantageously, the user 1 may chose to have the list of at least one alternative number delivered to a provided email address.

In another embodiment, the SMS message—or any other message type—may contain a link (such as a WAP or internet link) to a location containing the list of alternative numbers. Alternatively, the SMS message may contain a single number, which the user may call to retrieve a list of alternative numbers. The benefit of such alternative systems is that the entities associated with the alternative numbers can better track which alternative number, if any, was called by the user. This allows for the entity associated with the called alternative number to be charged for having been forwarded the call. In one embodiment, a link on a WAP or internet site to an alternative number may automatically attempt to make a connection when the link is selected by the user—a click-to-call arrangement. As the link may contain an alternative listing, a number of enhanced features may also be provided such as a map to see the location of one/several/all listings as well as inclusion of directions to and from these locations. Other enhancements may be offerings associated with the provided alternatives.

Still further, the list of derived alternative numbers 7, 9 may be maintained on the call management system 10, for subsequent access and use by the user 1. For example, the user 1 may later telephone an operator providing a call management system according to the present invention and be provided with the last generated list of alternative numbers 7, 9.

The above described examples involve the provision of alternative numbers 7, 9 whilst an attempt is being made to connect the user 1 to the first entity 3. When a connection is made to the first entity 3, the above embodiments may terminate their operations and allow the call to the first entity 3 to continue. Other embodiments, as described below, provide the user 1 with an opportunity to route a call to an alternative number 7, 9 after the connection to the predetermined number 4 has been established, i.e. when it has been answered; or even after the user 1 has completed call with the predetermined number 4.

Accordingly, in one embodiment, a call management system 10 according to the present invention may be configured to identify the status of a connection established between the user 1 and first entity 3. For example, in one embodiment, the call management system 10 is operable to determine if the first entity 3 answered the call but transferred the call to an answer telephone service. This may occur if the first entity 3 is engaged on another call; after a predetermined number 4 of rings; or if the first entity 3 is not available, etc. Many reasons exist as to why the call may be transferred to an answer telephone service. If the call is transferred to an answer telephone service, then the user 1 is unable to converse with the first entity 3.

In one embodiment of the present invention, the call management system 10 is operable to identify that a call was transferred to an answer telephone service and to provide the user 1 with alternative numbers 7, 9 by SMS message, following the completion of the call between the user 1 and the first entity 3 (or rather, with their answer telephone service). Thus, some time after the user 1 has ended the connection— perhaps having been disappointed in not being able to speak directly with the first entity 3—a call management system embodying the present invention is operable to provide the user 1 with at least one alternative number 7, 9, attributed to another entity 6, 8, based on the predetermined number 4 attributed to the first entity 3.

Figure 3:
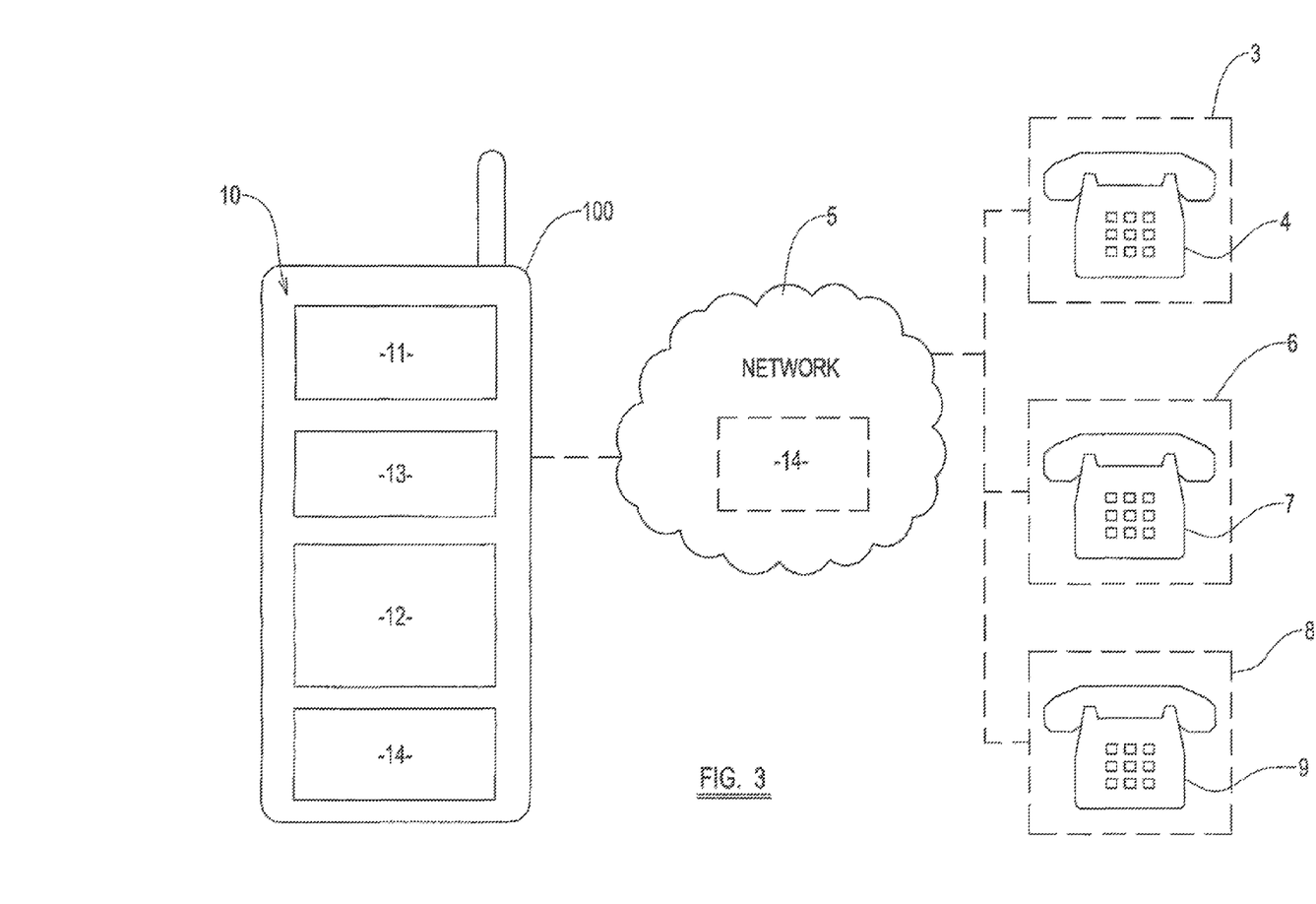
FIG. 3 shows a flow diagram of a method embodying the present invention.

As schematically shown in FIG. 3, a call management system 10 embodying the present invention may be embodied within a mobile telephone 100. Accordingly, the mobile telephone comprises the call monitor 11, processor 12 and router 13. Additionally, the mobile telephone 100 may comprise at least a part of a database 14. In one embodiment, the mobile telephone 100 is operable to connect to a telephone network 5 and communicates therewith. In one embodiment, the network 5 may comprise at least a part of a database 14. The part of the database 14 in the mobile telephone 100 and in the network 5 may together comprise a composite database 14. Each part of the database 14 in the mobile telephone 100 and the network 5 may comprise different forms of data. For example, the database 14 in the mobile telephone 100 may be pre-loaded with standard attributes. For example, the mobile telephone 100 could comprise a list of all of the national standard telephone dialling (STD) codes or those of the geographical area in which the mobile telephone 100 is registered.

In another embodiment, the entire database of the present invention may be implemented the internal memory of the telephone. The entire directory database may then be stored locally to the database. No access to the network would then be required, save for the routing of a call therethrough to a selected number.

Accordingly, when a user enters a B number into the mobile telephone 100 keypad, the database 14 in the mobile telephone 100 can determine the geographical location of the first entity associated with that B number. The mobile telephone 100, in which a call management system 10 embodying the present invention is embodied, may communicate with the part of the database 14 in the network 5 to derive at least one alternative number attributed to another entity in the same area, based on the predetermined number attributed to the first entity.

For example, suppose that a user is calling a plumber in a given city. A mobile telephone 100 embodying the present invention will determine, from the predetermined number associated with that plumber, that they are based in that specific city. Accordingly, the call management system 10 may only need to search for alternative plumbers in that city. There is no need for the network 5 to carry out any examination of the geographical location of the entity associated with the predetermined number, because the processor 12 of the mobile telephone 100 has already performed this task. This reduces the burden of resources on the network 5. By carrying out at least a part of the processing of the predetermined number on the mobile telephone 100, fewer resources of the telephone network 5 are required and, moreover, the call management system 10 can more quickly derive at least one alternative number to the predetermined number.

In one embodiment, the database 14 of the call management system 10 embodied in a mobile telephone 100 may be pre-loaded with further information. For example, a user could choose to store in the database 14 of the mobile telephone 100 all of the details of the entities in a given geographical area providing a particular service. For example, a user could choose to store the details of all pizza takeaway restaurants in the database 14 in the mobile telephone 100. Accordingly, should the user then attempt to contact his preferred pizza supplier, and they are busy on a call, then the numbers of alternative pizza suppliers may already be stored locally on his mobile telephone. Thus, there would be no need to access the network 5. Further, a convenient benefit of this arrangement is that the alternative numbers may more quickly be provided to the user.

In one embodiment, a call management system 10 embodying the present invention is embodied in a mobile telephone application. In one embodiment, the call management system is provided in an application, which may be loaded into the operating system of the mobile telephone, for example mobile operating systems like Symbian, Windows Mobile, RIM, iPhone, Linux, Android and other (mobile) operating systems.

The embodiments described above deliver at least one alternative number to the user by means of a display message or a voice message. In a preferred embodiment of the present invention, when the call management system 10 is embodied in an application on a mobile telephone 100, the at least one alternative number may be provided to the user on a graphical user interface on the mobile telephone application, without the need for a voice message. The use of a display message on a graphical user interface allows alternative numbers to be presented to the user even after a call has been completed (when the user would no longer have the phone to their ear to listen to the voice message).

Accordingly, to select at least one of the predetermined numbers, the user may simply use the cursor (or keypad) on the mobile telephone 100 to select the required alternative number. Upon selecting the required alternative number, the router 13 may then provide the user with an opportunity to route a or the call to the selected alternative number.

In all embodiments of the present invention, the processor of the call management system may only derive at least one alternative number when a predetermined condition has been met.

In one embodiment, a predetermined condition is that there has been no answer from the predetermined number after a predetermined period of time. In one embodiment, that predetermined period of time may be the average time an entity takes to answer a call. The predetermined period of time may, for example, be 5 seconds. However, the predetermined period of time may differ according to the entity associated with the number being called. For example, a residential first entity associated with a predetermined number may take over 10 seconds to reach the telephone and to answer the call. On the other hand, a business having a dedicated call centre may be expected to answer a call within just a few seconds.

A call management system embodying the present invention may avoid unnecessarily deriving alternative numbers. For example, if the predetermined period of time is too short, then the call management system 10 may derive alternative numbers, even though the user associated with the predetermined number was always going to answer the call. At the same time, if the predetermined period of time is too long, then the user may already have terminated their attempt to call the predetermined number by the time that the alternative numbers are offered to the user.

In another embodiment, the predetermined condition may be that the predetermined number is busy. Naturally, if the predetermined number is busy, then the entity associated therewith cannot answer the call from the user.

In another embodiment, the predetermined condition may be that the call has been established, but then terminated within a predetermined period of time after the connection was made. A particular benefit of this embodiment is where the predetermined number called by the user utilises a recorded message service or an automated telephone call handling system.

For example, suppose that the user contacts a first entity associated with the predetermined number and is met with a recorded message informing the user that the first entity's offices are closed for the day. Accordingly, even though a connection will have been established with the entity (by connecting to the recorded message service), the user will not have obtained the services they require. In such a case, if the user terminates the call within a predetermined time after a connection has been made, then the call management system 10 embodying the present invention is operable to provide them with at least one alternative number. In another embodiment, if the user is met with an automated call handling system, instead of a human operator, then he may not wish to deal with such an entity and terminate the call. So long as the call is terminated within the predetermined period of time, then the call management system embodying the present invention is operable to provide him with at least one alternative number based on his first call. The predetermined period of time, in this embodiment, must be short enough to ensure that all prematurely terminated calls are identified. However, it may not be so long that alternative numbers are provided to users who, although only conducted a short call, obtained the required services from the first entity.

In another embodiment, the user may establish a connection with the entity associated with the predetermined number. However, upon speaking to the entity, it may be established that they cannot provide the service required by the user. Accordingly, the call may be ended. If the call is ended within a predetermined period of time after the connection has been established, then a call management system 10 embodying the present invention is operable to provide the user with at least one alternative number.

The predetermined period of time may differ according to attributes of either the A number or the B number. As highlighted above, the average period of time an entity takes to answer a call may differ according to the type of entity. For example, a residential entity or a small business may take longer to answer a call, on average, than a large commercial organisation. Accordingly, the predetermined period of time may be configured according to a determination of the type of entity being called. Average answer times for popular entities may be stored in the database, and the predetermined period of time may be based on the average answer time.

In another embodiment of the present invention, the predetermined condition may simply be that the user positively requests to be provided with at least one alternative number. Such a request could be made at any time during an attempt to call a first entity or during, or even after, a call with that first entity. For example, after making a call, the user may recall the last number dialled (using the phone's internal log) and instruct a system embodying the present invention to process the number and provide alternatives.

In an embodiment of the call management system embodying the present invention, when a user selects at least one of the provided alternative numbers, the call management system may report this fact to a reporting module, which keeps track of which of the alternative numbers the user selects. The recording module may be a part of the telephone network 5. Alternatively, the reporting module may form a part of the mobile telephone 100, which periodically reports to a network-based system the details of the alternative numbers selected by the user. Such an embodiment conveniently allows the provider of a telephone network to keep track of the alternative numbers chosen by users and to charge an appropriate referral fee to each of the entities associated with the alternative numbers.

When embodied on a mobile telephone operating system, and wherein the contact details of the alternative entities include a web address, the web address associated with each provided alternative entity can be used to track any traffic to that website.

In other embodiments of the present invention, the call management system 10 may be operable to analyse an answer telephone service message left by a user 1. Preferably, the call management system 10 is configured to monitor and record a user 1's voice as the answer telephone message is being left. There is preferably not a need to directly access the answer telephone message itself. Conveniently, a system embodying the present invention is operable to analyse the recorded speech and to identify words therein. Each of the identified words may be used for subsequent analysis and manipulation to determine at least one alternative number associated with the identified word. For example, when the word comprises 'car', a system embodying the present invention may derive at least one telephone number of an entity which offers services in relation to cars.

In one embodiment, the returned entities may be car rental services, car breakdown services, car insurance providers, car sales garages etc. Conveniently, a system 10 embodying the present invention is operable to identify a plurality of words used during the answer telephone message, allowing the system to hone in on more relevant numbers (which are relevant to the largest number of words). Preferably, the derived at least one alternative number is based on at least one word spoken by the user 1 in the answer telephone message. For example, the words 'spare' and 'part' in addition to the word 'car' would render not relevant the provision to the user 1 of numbers relating to car insurance services.

In another embodiment of the present invention, the system 10 may be operable to analyse an answer telephone message left by the user on the answer telephone of a non-business entity. For example, a user may call a friend (having a residential B number) and leave a message. The message may involve a suggestion of an activity the user and the friend may partake in. For example, if the user were to leave a message relating to a suggestion of going to a cinema, a system embodying the present invention may identify the word 'cinema' and provide the user, or even the first entity, with an opportunity to route the or a call to a cinema. The cinema may be selected so as to be close to either the user or the friend, or equidistant from the two.

In another arrangement, a call management system may be provided which actively transcribes a voice message as left by a user. A transcribed voice message may then be searched for key words and the user may be provided with the contact details of entities providing services related to those key words. Alternatively, or additionally, the transcribed voice message may be provided to the user and the key words may be embedded with hyperlinks to an associated web page of an associated entity.

With all embodiments of the present invention, if a user 1 is routed to an alternative number 7, 9, and a connection between the user 1 and the other entity 6, 8 associated with the alternative number 7, 9 fails, then a system 10 embodying the present invention may attempt to make a connection with at least a further alternative number 7, 9. The order in which connections to entities 6, 8 are attempted to be connected may be determined in accordance with the bids submitted by the entities 6, 8. If a call routed to the first or subsequent alternative number fails, then embodiments of the present invention provide for the user to be presented with options. For example, the user may choose to be sent an SMS message (or any other type of message) with a list of alternative numbers or/and be directed to a human-operated directory service. Such options may be made available after the failure to connect to the first alternative number; the second alternative number; the third alternative number etc. Alternatively, the options may only be presented to the user when the entire list of alternative numbers has been exhausted.

In an embodiment of the present invention, the call monitor 11 is operable to identify that a call by a user 1 to a predetermined number 4 was not answered. The processor 12 is configured to derive at least one alternative number, attributed to another entity, based on the predetermined number 4 attributed to the first entity 3. The router 13 is configured to provide a user 1 with an opportunity to route a call to at least one of the derived at least one alternative numbers.

The router 13 is configured to automatically provide the user 1 with a text message (SMS)—or any other type of message—indicating at least one of the derived at least one alternative number. Conveniently, the user 1 is provided with the opportunity to route a call (for example a link to a remote WAP or internet site) to at least one of the alternative numbers upon receipt of the message.

In another embodiment, there may be provided a call management system, comprising: a call monitor to identify an attempt, in use, by a user to call a predetermined number attributed to a first entity providing a service; a processor, to derive at least one alternative number attributed to another entity, based on the predetermined number attributed to the first entity, when a predetermined condition has been met, wherein the said another entity provides a dissimilar service to that of the first entity; and a router to provide a user with an opportunity to route a or the call to at least one of the derived at least one alternative numbers.

The other entity may provide a service which is known to be at least of peripheral interest to a user who is attempting to contact the first entity. For example, if the first entity is a car repair garage, the identified at least one other entity may be a car sales garage. For example, if a user's car has broken down, he may be slightly more inclined to buy a new car than to pay for his existing car to be repaired, especially if the required repairs are expensive. Accordingly, when the user calls the repair garage, a system according to the present invention may provide the user with the opportunity to route a call to a car sales garage. It will be appreciated that although a car repair garage and car sales garage may not be direct competitors with one another, the user may be interested in the services on offer from both.

The user may be provided with alternative numbers whilst the call to the first entity is attempting to connect. Alternatively, or additionally, the user may be provided with alternative numbers after he has completed a call to the first entity. For example, some time after the call has been completed, the user may be sent a message (SMS), providing him with a list of alternative numbers of entities which offer services that may be of interest to the user. In one embodiment, when the system is implemented on a mobile telephone running Symbian (or any other mobile operating system), a the alternative numbers may be presented to the user by way of a pop-up message on the display screen of the mobile telephone.

Another example may include when a user attempts to call a flight ticket booking service. Before, during or after the call is connected, the user may be provided with alternative numbers for related services, such as holiday insurance, accommodation, car hire, etc, etc.

Another system embodying the present invention may be operable to monitor a plurality of call attempts by a user. Attributes associated with each call, and the corresponding first entity, may be stored and later analysed. Alternative numbers may be provided to the user, based on the user's call history. For example, it may be determined that the user has contacted a provider of banking services. Further, it may be determined that the user separately contacted a provider of credit services; and later a provider of mortgage services. A system embodying the present invention may analyse attributes associated with each of the called entities and provide alternative numbers to the user. For example, a system may provide the user with a number of another entity which offers ALL of the services the user previously sought. The user may decide to route a call to the alternative number and later employ the services of the other entity to consolidate his financial services. As a result, the user's finances will be more manageable and the other entity associated with the dialled alternative number will gain a new customer, without needing to actively seek the user's business. The other entity may pay a fee to the operator of the system or method, in return for the referral.

Figure 4:
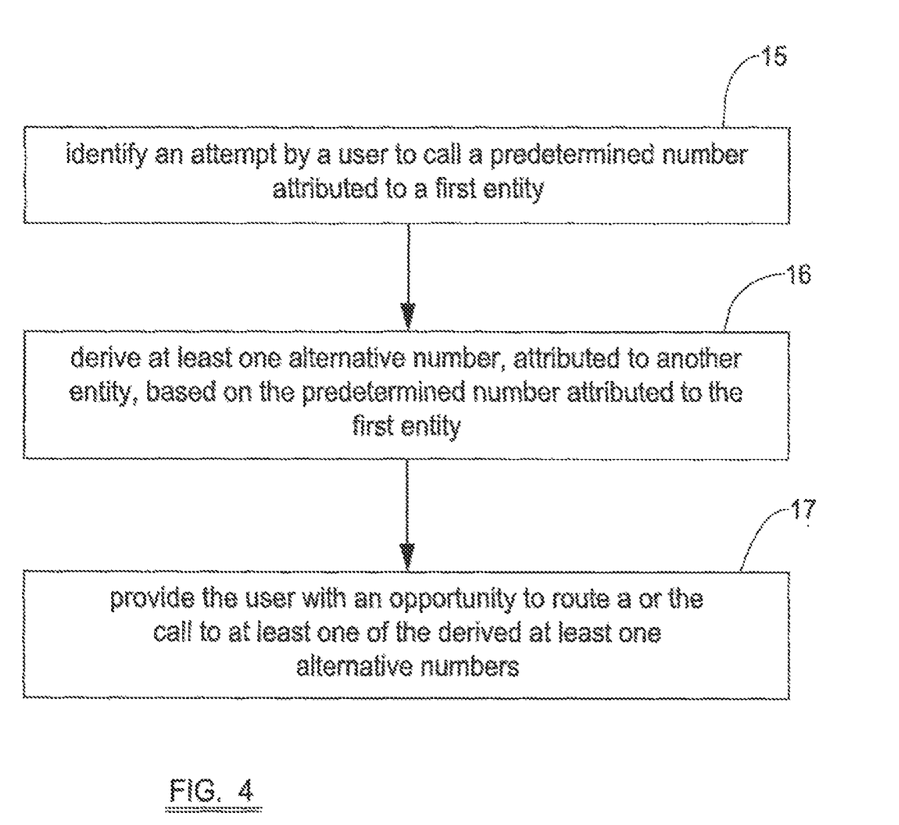
FIG. 4 shows a schematic representation of a mobile telephone embodying the present invention.

As shown in FIG. 4, a method embodying the present invention identifies 15 an attempt by a user 1 to call a predetermined number 4 attributed to a first entity 3. In one embodiment, this operation is performed by the call monitor 11 as shown in FIG. 2 or 3.

Next, a method embodying the present invention derives 16 at least one alternative number 7, 9, attributed to another entity 6, 8, based on the predetermined number 4 attributed to the first entity 3. Preferably, this operation is performed by a processor 12 of a call management system 10 embodying the present invention, as shown in FIGS. 2 and 3. Having derived at least one alternative number 7, 9, the user 1 is then provided 17 with an opportunity to route the call to at least one of the derived at least one alternative numbers 7, 9. Preferably, this operation is carried out by a router 13 of a call management system 10 embodying the present invention.

Preferably, a system 10 according to the present invention is only operated when it has been determined that the predetermined number 4 is that of a business entity. If the predetermined number 4 is identified as being a residential number, then no alternative numbers 7, 9 are offered to the user 1. A further representative method embodying the present invention is shown in FIG. 5.

Figure 5:
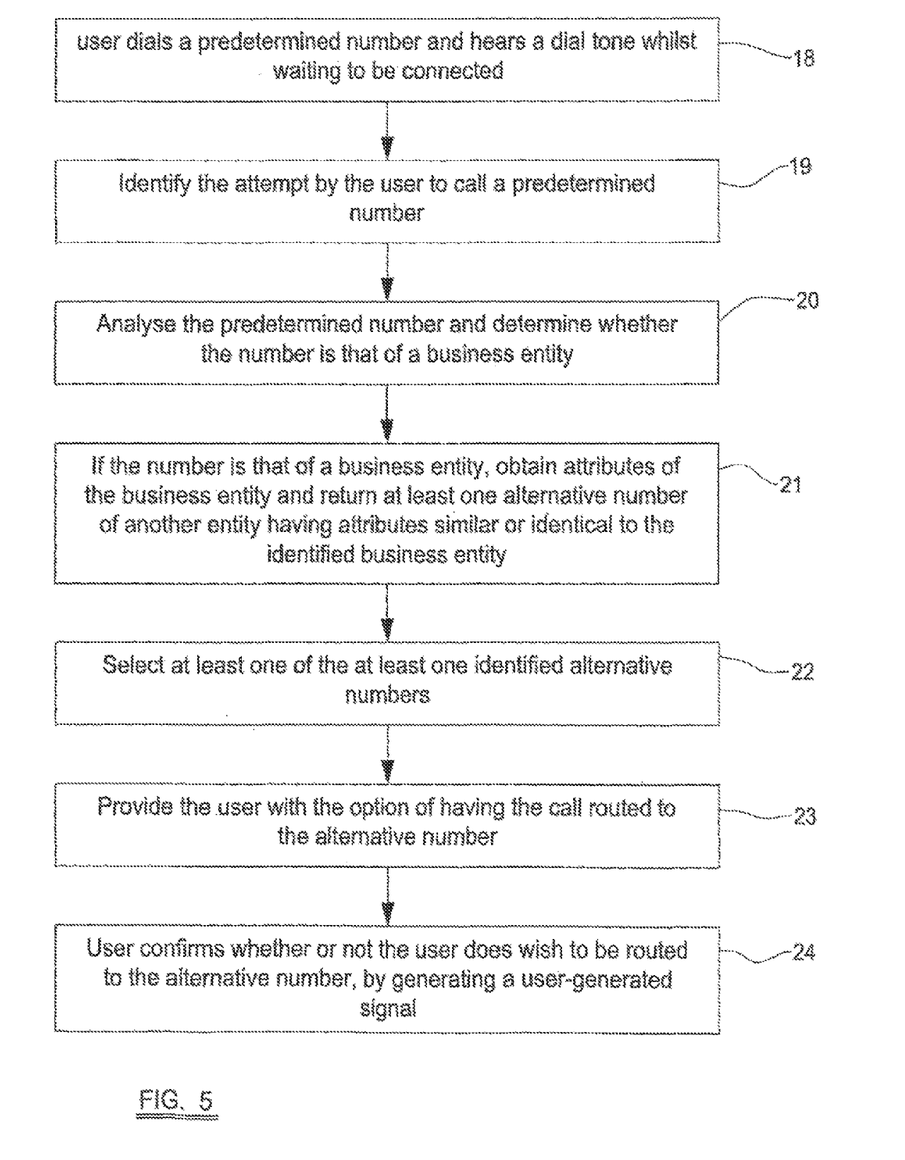
FIG. 5 shows a flow diagram of another method embodying the present invention

As shown in FIG. 5, a user 1 dials 18 a predetermined number 4 and hears a dial tone whilst waiting to be connected.

Next, the attempt by the user 1 to call a predetermined number 4 is identified 19.

Then, the predetermined number 4 is analysed to determine 20 whether the number is that of a business entity.

Then, if the number is that of a business entity, attributes of the business entity are obtained 21 and at least one alternative number of another entity having attributes similar or identical to the identified business entity are returned.

Then, at least one of the at least one identified alternative numbers is selected 22.

Then, the user 1 is provided 23 with the option of having the call routed to the alternative number. Preferably, the options are presented to the user in a voice announcement.

Conveniently the voice announcement is provided by an Interactive Voice Response (IVR) system.

Finally, a user generated signal confirms 24 whether or not the user 1 does wish to be routed to the alternative number. The user generated signal may be a single key, a combination of keys, or a voice command. Where the alternative numbers are provided to the user by way of an on-screen message, the user may move the cursor to highlight the required number and then select it. The selection could be effected either by a joypad or the number keypad on the phone.

Figure 6:
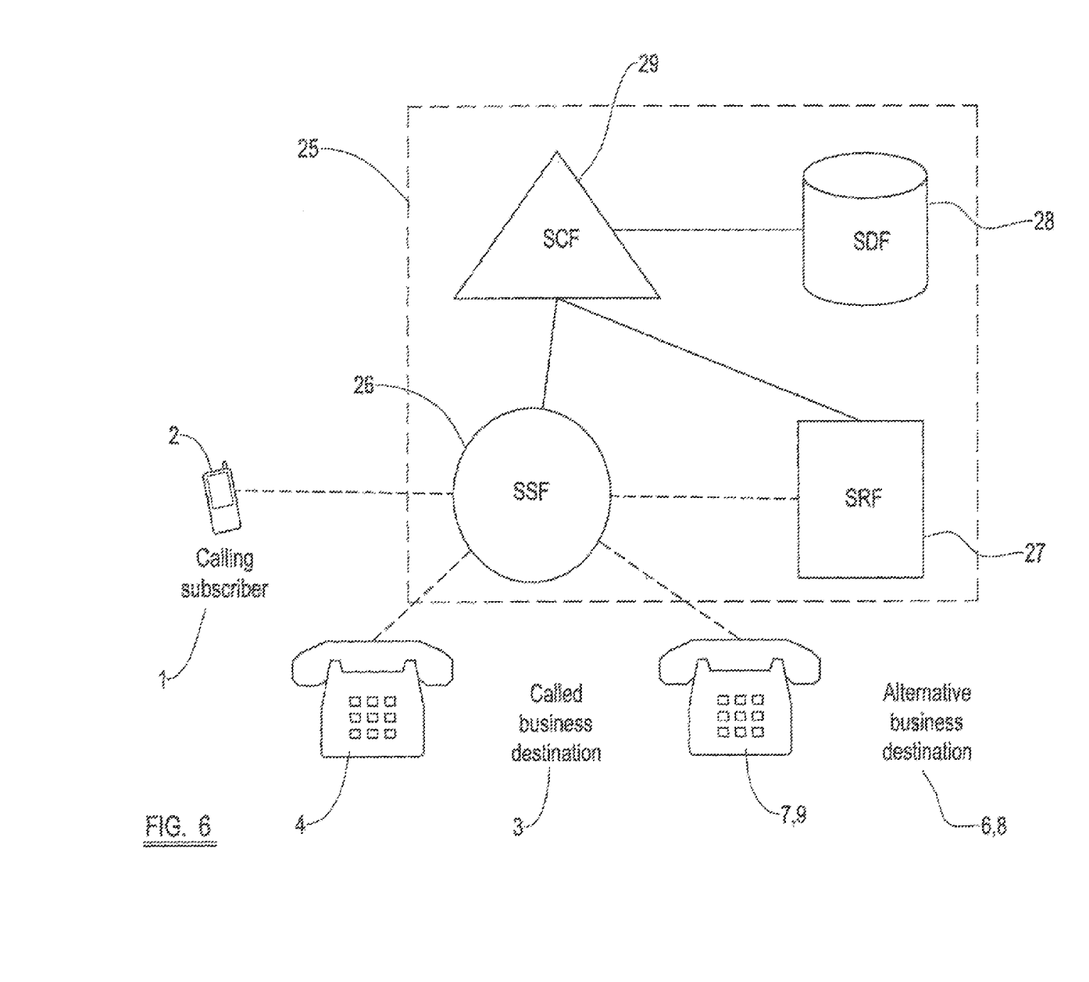
FIG. 6 shows a schematic representation of an intelligent network of a telephone system operable to carry out a method of managing a call embodying the present invention.

FIG. 6 shows a schematic representation of a network structure 25 operable to provide a call management system 10 embodying the present invention and operable to perform a method of managing a call embodying the present invention. The network structure comprises a Service Switching Function 26 (SSF), Specialised Resource Function 27 (SRF), Service Data Function 28 (SDF) and a Service Control Function 29 (SCF). Preferably, the network structure 25 comprises an Intelligent Network (IN), configured to provide a call management system 10 embodying the present invention and operable to perform a method of managing a call embodying the present invention.

In one embodiment, the SSF 26 is operable to determine whether a B number is a business or residential number, or otherwise determine other attributes associated with the B number. In another embodiment, said determination is performed by the SCF 29. In such an embodiment, the SCF 29 may be operable to interrogate the SDF 28 directly to ascertain whether the B number is a business number. The SDF 28 may incorporate a directory of all known business numbers. If a B number is found to be a business number, subsequent operations on the number may then be performed.

Figure 7:
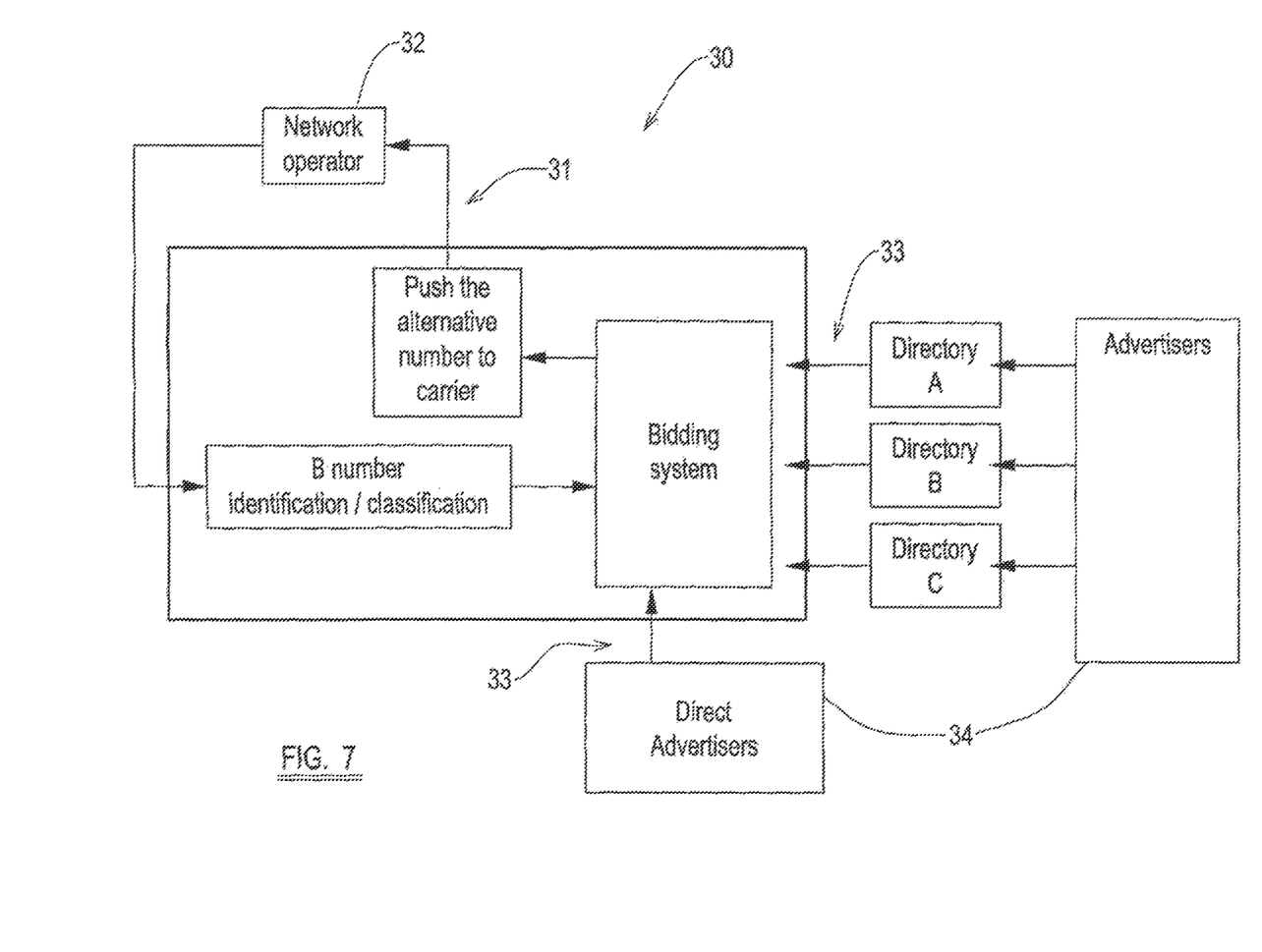
FIG. 7 shows a schematic representation of another call management system embodying the present invention.

FIG. 7 shows a schematic representation of a further call management system 30 embodying the present invention. The system comprises a connection 31 with the network operator 32, and a connection 33 between the call management system 30 and advertisers 34. As shown in FIG. 6, when a system 30 embodying the present invention identifies at least one alternative number 7, 9, it may 'push' this to the network operator 32, which handles the subsequent routing of the call to the alternative number 7, 9. Similarly, the network operator 32 may provide the call management system 10 with the B number.

Figure 8:
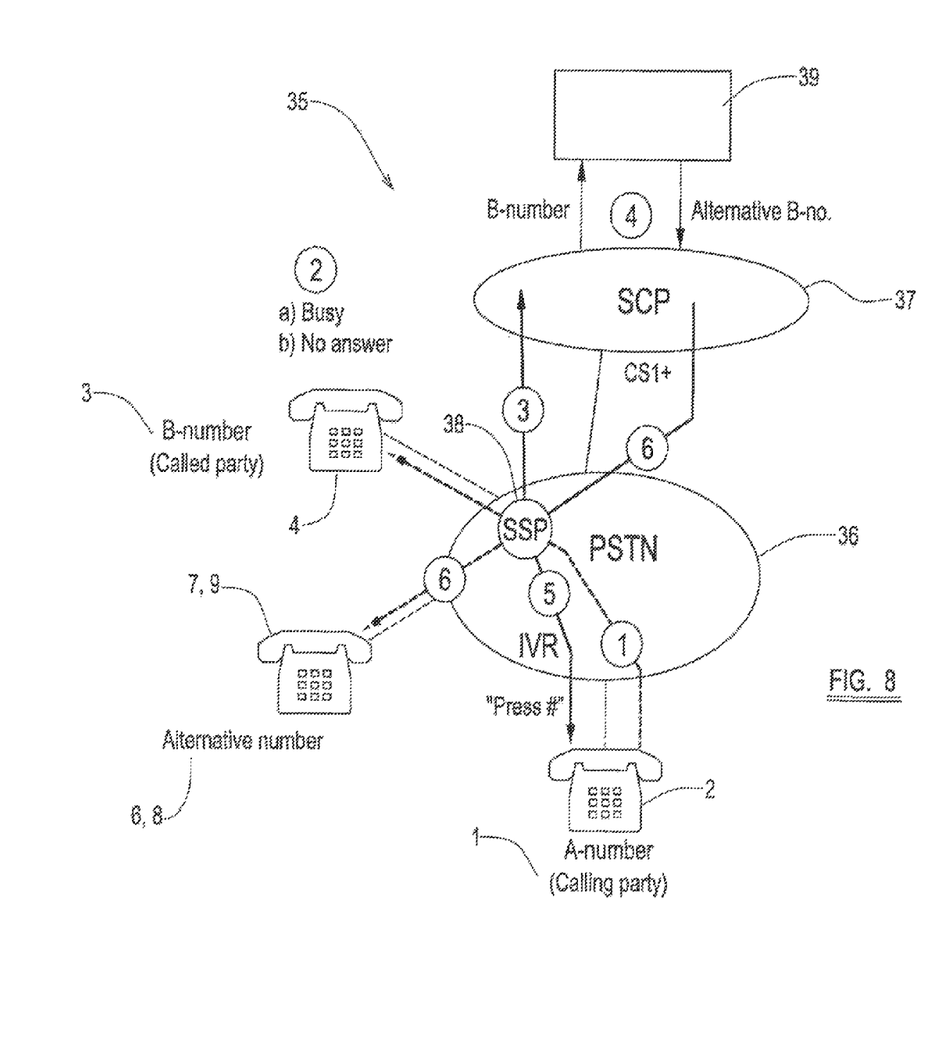
FIG. 8 shows a schematic representation of another call management system embodying the present invention, in use.

FIG. 8 shows a schematic representation of a call management system 35 embodying the present invention, implemented on a network arrangement comprising a Public Switched Telephone Network (PSTN) 36 and a Service Control Point (SCP) 37. The PSTN 36 may incorporate a Service Switching Point (SSP) 38. A method of using the call management system 35 is described below:

1. User 1 tries to call a first entity 3
2. First entity 3 is busy or no answer
3. The Service Switching Point (SSP) 38 sends a request to the Service Control Point (SCP) 37 for action
4. The SCP 37 sends the B-number 4 associated with the first entity 3 to a processor 39. The processor 39 derives at least one alternative and/or relevant number 7, 9 of an another entity 6,8.
5. If an alternative number 7,9 exists, an message informs the user 2 that he can press #
6. If the user presses # the alternative number will be used by the SSP 38 to forward the call to at least one of the alternative numbers 7, 9.

In another embodiment, the PSTN 36 may be replaced, or combined with or form a part of a Public Land Mobile Network (PLMN). Whereas the PSTN 36 may communicate with the SCP 37 using the CS1+ protocol, the PLMN may communicate with the SCP 38 using one or both of the CS1+ or Customised Applications for Mobile Network Enhanced Logic (CAMEL) protocols. In another embodiment, the PSTN 36 may be replaces, or combined with or form a part of an Internet Protocol network. In one embodiment, a call management system embodying the present invention may be implemented on any one or all of a PSTN 36, PLMN or IP network. Methods of integrating such systems are known to the skilled person. In another embodiment, the SCP 37 may be replaced, or combined with or form a part of a Call Processing Server (CPS). In one embodiment, a call management system embodying the present invention may be implemented on a network comprising an interlinked arrangement of a PSTN 36, SCP 37, PLMN, IPN and CPS.

In preferred embodiments of the present invention, the call management system is implemented by a third party, having no association with either the first entity or any of the other entities attributed to alternative numbers. The first entity or other entities may not directly influence or control how the call management system or method according to the present invention is operated or carried out. Indeed, some of the other entities may have entered a bid to be listed as one of the alternative numbers but the operator of the system or method ultimately decides the order or manner in which alternative number are provided to a user.

Conveniently, the operator of a system embodying the present invention has no connection or contact with the first entity. In the case where the first entity is a business, the operator of a system or method of the invention has no commercial relationship with the first entity. Preferably, the other entities identified by the present invention are competitors with one another and competitors of the first entity. There may be no commercial relationship between the entities.

Alternatively, the other entities may not be direct competitors of the first entity but may provide similar services to the first entity. Nevertheless, the first and other entities may still not be commercially connected to one another.

Preferably, if a user decides to have a call routed to one of the provided alternative numbers, the other entity attributed to the called alternative number pays a predetermined amount to the operator of the system or method of the present invention. As such, the other entities pay for the privilege of the system or method operator providing them with a potential customer lead. It will readily be appreciated that numerous other remuneration strategies and systems may be employed.

In one arrangement, the system may not be provided in a telephone but implemented in a telephone network. In such an arrangement, a user's telephone acts as a trigger, to send a predetermined instruction to the network to provide alternative numbers to the user.

In embodiments of the present invention, the call management system may be operable to analyse the predetermined "B"-number and derive therefrom attributes associated with the first entity associated with the predetermined number. Additionally or alternatively, a call management system embodying the present invention may be configured to analyse the telephone number ("A"-number) and attributes of the user of the call management system. For example, a call management system embodying the present invention may maintain a history of all of the "B"-numbers called by a given "A"-number. The call management system may derive from this call history appropriate alternative numbers to be offered to the user. For example, a call management system embodying the present invention may determine that a user regularly calls a number of different entities providing a similar service. It can be derived from such a call history that a user is not particularly loyal to a given entity providing the service. For example, a user may regularly wish to order a take-away pizza. If the user calls different Italian restaurants each time to deliver the pizza, then it can be deemed that the user is not loyal to a particular Italian restaurant. In such a case, a call management system embodying the present invention may derive that the user is amenable to ordering pizzas from alternative Italian restaurants and provide the user with alternative numbers. Accordingly, such an arrangement does not just carry out an analysis of the "B-number" but also analyses the call history of the "A-number".

A call management system embodying the present invention is compatible with all types of telephone networks, for example, cellular (i.e. mobile), fixed line or VoIP telephony networks. For example, a user of a call management system may be using a cellular telephone to contact a fixed line telephone of the first entity. In another embodiment, both the user and the first entity may be using mobile telephones. It will be apparent that many configurations exist. Modern telephony networks comprise a hybrid of many communication protocols and methods. The present invention is readily implemented on such hybrid networks. The alternative numbers provided by a call management system embodying the present invention may not all be of the same type. For example, at least one of the returned alternative numbers may be a cellular telephone number, another may be a fixed line telephone number and a further number may be that of a VoIP telephone.

In one embodiment, at least a part or all of a call management system embodying the present invention may be implemented on an existing communication network. In another embodiment, at least a part of the call management system may be implemented on an external module, system or device, which may be integrated with an existing communication network.

In one embodiment, at least a part of a call management system embodying the present invention may be implemented on the hardware and/or software of a telephone unit. In one embodiment, the call management system may be implemented in at least one of the memory card, SIM card, RAM, ROM of a mobile telephone.

An advantage of the present invention is that the user may obtain the services he requires, despite the first entity not being able to offer the services. Further a call management system provides a useful directory service for the user.

A technical benefit of the present invention is that a higher proportion of calls from a user may be connected. Further, a technical benefit is that the system automatically determines at least one alternative number based on attributes of the number being dialled, and routes the or a call to a selected one of the alternative numbers.

Preferably, the call management system of the present invention may be implemented on a mobile telephone. The benefit of a call management system operable on a mobile telephone over a call management system operable on a network is that many of the operations may be carried out on the mobile telephone, instead of needing the resources of the mobile network. Not only does this reduce the burden on the telephone network but may also increase the speed at which alternative telephone numbers may be provided to the user. Further, the implementation of a call management system on a mobile telephone allows for the user to store local relevant information to the mobile telephone, which the call management system may access and act upon, as described herein.

A mobile telephone embodying the present invention may comprise a keypad, user display, CPU, battery, internal memory (RAM and ROM), removable memory (micro SD, Flash etc) and an antenna. A call management system embodying the present invention may be implemented in a hard wired hardware module to be installed into a mobile telephone. In an alternative implementation, at least one of the CPU, internal memory, external memory or SIM card of the mobile telephone may be configured so as to provide a call management system embodying the present invention. At least a part of the database could be stored on a removal external memory card The present invention further comprises a computer-readable medium having a computer-executable instructions configured to perform a method embodying the present invention.

When the term "alternative numbers" is used in this description, it is to be read as meaning "at least one alternative number, attributed to another entity, based on the predetermined number 4 attributed to the first entity 3". The term is used for the sake of brevity and is not to be seen as limiting.

The term telephone includes a fixed line telephone and a mobile telephone. The telephone may be operable in a conventional telephone network, a mobile network, a VoIP network and any other network. The mobile network may be GSM, 3G, CDMA or any other known network standard. The term mobile telephone (telephone) includes "cell telephone".

By "route" is meant to route an existing call or to connect a new call. For example, an existing call between a user and a first entity may be routed to a second entity; or a new call may be initiated between the user and second entity.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of managing a call from a mobile telephone, the method comprising:
   identifying an attempt by a user to call, subsequent to initiation of the call by the user with the mobile telephone and at least prior to initiation of the call by the mobile telephone over a telephone network, a predetermined number attributed to a first entity;
   deriving from a database, at least a portion of which is located on the mobile phone, at least one alternative number attributed to another entity based on the predetermined number attributed to the first entity when a predetermined condition has been met, the deriving based on the identification of an attempt by the user to call the predetermined number attributed to the first entity; and
   providing the user with an opportunity to initiate another call to at least one of the derived at least one alternative numbers from the mobile telephone.

2. The method of claim 1, wherein at least a portion of the database is located on a network.

3. The method of claim 2, wherein the portion of the database located on the network and the portion of the database located on the mobile phone are comprised of different forms of data.

4. The method of claim 1, further comprising:
   identifying the first entity from the predetermined number.

5. The method of claim 4, further comprising:
deriving attributes of the first entity.

6. The method of claim 5, further comprising:
identifying at least one other entity having attributes similar or identical to the derived attributes of the first entity.

7. The method of claim 1, further comprising:
receiving bids from entities to ensure that a number associated with each bidding entity is one of the derived at least one alternative numbers.

8. The method of claim 7, wherein the derived at least one alternative number is based at least in part on the bid value of each bidding entity.

9. The method of claim 1, further comprising:
transmitting a voice message to the user while the attempt to call the predetermined number is being made.

10. The method of claim 1, wherein the first entity provides a service, and the said other entity provides a dissimilar service to that of the first entity.

11. An apparatus comprising:
a user interface and a processor coupled therewith; and
a call management system stored on a memory, the call management system comprising a computer software program loaded in an operating system and executable by the processor to:
cause the processor to identify, using a call monitor, an attempt, via the user interface, by a user to call a predetermined number attributed to a first entity, the call monitor being further configured to identify the attempt subsequent to initiation of the call by the user with the mobile telephone and at least prior to initiation of the call by the mobile telephone over a telephone network;
cause, based on the identification of an attempt by the user to call the predetermined number attributed to the first entity, the processor to derive using a composite database, at least one alternative number attributed to another entity based on the predetermined number attributed to the first entity when a predetermined condition has been met; and
cause the processor to provide the user via the user interface an opportunity to initiate another call to at least one of the derived at least one alternative numbers from the mobile telephone over the telephone network.

12. The apparatus of claim 11, wherein the composite database is comprised of data obtained from a mobile phone and a network.

13. The apparatus of claim 11, wherein the processor is configured to identify the first entity from the predetermined number.

14. The apparatus of claim 13, wherein the processor is configured to derive attributes of the first entity.

15. The apparatus of claim 14, wherein the processor is configured to identify at least one other entity having attributes similar or identical to the derived attributes of the first entity.

16. The apparatus of claim 11, further comprising a bidding system, operable to receive bids from entities to ensure that a number associated with each bidding entity is one of the derived at least one alternative numbers.

17. The apparatus of claim 16, wherein the processor is configured such that the order of the derived at least one alternative number is based at least in part on the bid value of each bidding entity.

18. A mobile telephone comprising:
a call monitor operable to identify an attempt by a user to call a predetermined number attributed to a first entity, the call monitor being further configured to identify the attempt subsequent to initiation of the call by the user with the mobile telephone and at least prior to initiation of the call by the mobile telephone over a telephone network;
a processor configured to derive from a database, at least a portion of which is stored in a network database, at least one alternative number attributed to another entity, the at least one alternative number based on the predetermined number attributed to the first entity, when a predetermined condition has been met, wherein the deriving is triggered based on the identification of an attempt by the user to call the predetermined number attributed to the first entity; and
a router configured to provide the user with an opportunity to initiate another call to at least one of the derived at least one alternative numbers from the mobile telephone over the telephone network.

19. The mobile telephone of claim 18, wherein at least a portion of the database is stored in a mobile phone database.

20. The mobile telephone of claim 19, wherein the portion of the database stored on the network and the portion of the database stored on the mobile phone are comprised of different forms of data.

* * * * *